United States Patent [19]

Tsuya et al.

[11] Patent Number: 5,047,274

[45] Date of Patent: Sep. 10, 1991

[54] ANNODIZED ALUMINUM SUBSTRATE FOR A MAGNETIC RECORDING DISK IN WHICH PORES ARE FILLED WITH A NON MAGNETIC MATERIAL AND THE SURFACE POLISHED AND ETCHED

[76] Inventors: Noboru Tsuya, 3-13-11, Hachimanyama, Setagaya-Ku, Tokyo; Tadao Tokushima, 1-18-1, Izumi; Toshiro Takahashi, 350-29, Ose-cho, both of, HamamatsuI-shi, Shizuoka-ken, all of Japan

[21] Appl. No.: 218,202

[22] Filed: Jul. 13, 1988

[30] Foreign Application Priority Data

Sep. 28, 1987 [JP] Japan .............................. 62-243074

[51] Int. Cl.⁵ ............................................. G11B 23/00
[52] U.S. Cl. ..................................... 428/64; 428/694; 428/695; 428/900; 360/135; 427/128
[58] Field of Search ......................... 428/900, 694, 64; 427/128

[56] References Cited

U.S. PATENT DOCUMENTS

| | | | |
|---|---|---|---|
| 3,886,052 | 5/1975 | Smith | 204/33 |
| 4,109,287 | 8/1978 | Kawai et al. | |
| 4,525,759 | 6/1985 | Valayil et al. | 360/135 |
| 4,548,682 | 10/1985 | Yoshida et al. | 204/35.1 |
| 4,563,397 | 1/1986 | Ishiguro et al. | 428/469 |
| 4,650,708 | 3/1987 | Takahashi | 428/216 |
| 4,681,669 | 7/1987 | Takahashi et al. | 204/35.1 |
| 4,689,260 | 8/1987 | Briska et al. | 428/161 |
| 4,698,251 | 10/1987 | Fukuda et al. | 428/64 |
| 4,761,330 | 8/1988 | Tokushima et a. | 428/312.8 |

OTHER PUBLICATIONS

Patent Abstracts of Japan, [2721], vol. 11, No. 274 (P-612), Sept. 5, 1987; & JP-A³62 073 425 (Pilot Precision Co. Ltd.).

*Primary Examiner*—Merrell C. Cashion, Jr.
*Assistant Examiner*—Stevan A. Resan
*Attorney, Agent, or Firm*—Oblon, Spivak, McClelland, Maier & Neustadt

[57] ABSTRACT

A substrate for a magnetic recording disk, made of anodized aluminum having its pores packed with a non magnetic material and having been subjected to polishing followed by an etching treatment to form a finely roughened surface due to preferential etching of either the aluminum or the non magnetic material.

2 Claims, 12 Drawing Sheets

X400

X400

ANNODIZED ALUMINUM SUBSTRATE FOR A MAGNETIC RECORDING DISK IN WHICH PORES ARE FILLED WITH A NON MAGNETIC MATERIAL AND THE SURFACE POLISHED AND ETCHED

BACKGROUND OF THE INVENTION

1. Field of the Invention

The present invention relates to a substrate for a magnetic disk, which is useful for a hard disk or a flexible disk, and a process for its production. More particularly, it relates to a substrate for a magnetic disk suitable for a continuous thin film of metal type magnetic recording medium.

2. Discussion of Background

A magnetic recording medium using a thin magnetic film of metal such as Co—Cr alloy or Co—Ni alloy is expected to be useful as a high density recording medium in view of its high saturation magnetic density and surface smoothness, and it is studied for a wide range of practical applications in various regions. In particular, Co—Cr having perpendicular magnetic recording properties has been developed to have a linear recording density as high as 200 KBPI. Further, Co—Ni has been reported to have a linear recording density of 70 KBPI when used as a thin film horizontal magnetic recording medium having a thickness of about 500 Å.

Both of the above-mentioned magnetic recording media are far superior to the most commonly employed $\gamma$-$Fe_2O_3$ coating type medium, the linear recording density of which is from 15 to 20 KBPI.

However, a continuous thin film medium having such excellent magnetic recording properties has not yet been practically widely employed. One of the factors preventing the practical application is a problem concerning the sliding properties of the magnetic head and the medium.

Namely, a continuous thin film medium made of metal has a smooth surface, and it is likely to lead to magnetic head crush due to sticking of the magnetic head and the medium in the case of a hard disk and it is likely to lead to magnetic head crush due to an increase of the friction coefficient during the sliding operation because of the difficulty in maintaining the lubricant in the case of a flexible disk.

To solve these problems, it has been attempted to apply mechanical texture treatment i.e. surface treatment of imparting linear scratch marks to the substrate surface by means of e.g. sand paper. FIG. 13 is a differential interference microscopic photograph (400 magnifications) showing the surface texture of a substrate after the mechanical texture treatment, and FIG. 14 is an enlarged perspective view of an area of 248 $\mu$m × 248 $\mu$m of the same surface texture by means of a laser interference-type roughness meter.

This mechanical texture treatment is effective to some extent. However, in the case of a medium where high density recording is required, it is likely to lead to an increase of bit errors depending upon the density or the depth of the texture (linear scratch marks), whereby it is difficult to control the bit errors at a mass production level. Namely, if the track width of the magnetic recording is as narrow as from 10 to 20 $\mu$m, the modulation (the change in the reproduction output when the recording current is varied) tends to exceed 10% unless the width of the texture is made to be at a level of 1/10 of the track width. Further, if the depth of grooves of the texture exceeds 200 Å, the head output tends to decrease by 10% or more, whereby the modulation tends to increase. Even if a texture satisfying these requirements can be obtained, if the number of linear marks per unit area is small, there will be a problem of sticking since the sliding area of the magnetic head is as large as 0.5 mm × 4 mm. Further, because of irregularities in the roughness such as burrs formed by the mechanical texture treatment, the distance between the head and the magnetic recording medium can not adequately be shortened. Accordingly, it is difficult to increase the recording density due to the spacing loss. Especially in the case of a hard disk, such irregularities in the roughness produce dust during CSS operation, and such dust adheres to the head and the medium, thus causing head crush.

SUMMARY OF THE INVENTION

It is an object of the present invention to solve the above-mentioned problems and to provide a substrate for a magnetic disk which is capable of providing sliding properties free from the magnetic head crush between the magnetic head and the medium, by forming a two dimensional finely and regularly roughened surface on an anodized aluminum having pores packed with a material different from the substrate in the etching rate by etching treatment utilizing the difference in the etching rate of the substrate and the material packed in the pores of the anodized aluminum, i.e. taking advantage of the regularity of the pores of anodized aluminum, namely the pore diameter and the pore distance (cell diameter) being very small and uniform and the pore distribution being unifom.

Another object of the present invention is to provide a process for producing a substrate for a magnetic disk having the above-mentioned fine roughness on the surface.

In its first aspect, the present invention provides a substrate for a magnetic disk, made of anodized aluminum having pores packed with a material different from the substrate in the etching rate and having been subjected to etching treatment to form a finely roughened surface due to the difference in the etching rate of the substrate and the material.

In its second aspect, the present invention provides a process for producing a magnetic disk, which comprises packing pores of an anodized aluminum substrate with a material different from the substrate in the etching rate, polishing the packed substrate to have a smooth surface and subjecting the polished substrate to etching treatment to form a finely roughened surface.

BRIEF DESCRIPTION OF THE DRAWINGS

FIG. 5 shows the results of the high humidity tests, and FIG. 6 shows the results of the high temperature running tests.

FIG. 10C is a graph showing the frequency characteristics.

DETAILED DESCRIPTION OF THE PREFERRED EMBODIMENTS

Figure 1A:
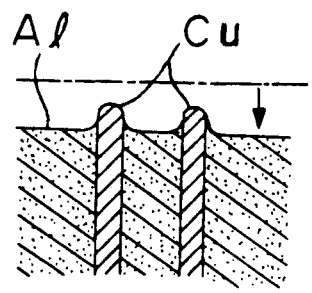
FIGS. 1(a) and 1(b) are enlarged cross sectional views of substrates of the present invention showing the surface structures after the etching treatment.

The substrate for a magnetic disk according to the present invention is the one obtained by subjecting an anodized aluminum substrate having pores packed with a material different from the substrate in the etching rate, for example, a physical etching rate such as sputtering or a chemical etching rate such as chemical dissolution, to polishing and to etching treatment to form fine protrusions or recesses with surface of the anodized aluminum layer of the substrate due to the difference in the etching rate of the anodized aluminum and the material.

Accordingly, the diameter and the distance of the protrusions or recesses constituting the surface roughness correspond to the diameter and the distance of the pores of the anodized aluminum, and their distribution is very uniform. By properly adjusting the depth of roughness, it is possible to obtain a friction coefficient suitable to the magnetic head, whereby it is possible to provide a magnetic disk having sliding properties not to cause the magnetic head crush.

In the process of the present invention, a material different from the anodized aluminum in the etching rate, such as Cu, Sn, Ni, Zn, NiO, a resin or Ni-Sn, is precipitated or impregnated and packed in the pores of the porous anodized aluminum substrate by electrical precipitation treatment or coating treatment utilizing heating and cooling, or by sputtering in the case where the pore diameters are large. The packing may not necessarily reach to the bottoms of pores. In the case of the sputtering treatment or the coating treatment, any optional material may be chosen. In the case of an organic coating material containing a metal oxide powder, reducing treatment may be applied after coating to precipitate metal (IBM Technical Disclosure Bulletin, Vol. 11, No. 3, August 1968). The pore diameter and the pore distance can optionally be controlled within ranges of from 100 to 400 Å and from 400 to 2,000 Å, respectively, by adjusting the voltage for the treatment of the anodized aluminum and the condition for pore widening treatment. After the packing treatment, the substrate is polished to have a smooth surface, followed by etching treatment. The etching treatment is preferably conducted by chemical etching. However, a physical method such as sputtering may also be employed. By this etching treatment, a texture comprising regular two dimensional fine roughness corresponding to the pore distribution is formed on the substrate surface. Since the surface is uniform as opposed to irregular roughness formed by mechanical texture treatment, the noise level of the magnetic material can be reduced to about ½.

Depending upon the type of the material precipitated in the pores, the surface may sometimes be soft. In such a case, the surface may be hardened by coating a hard layer thereon by electroless plating or sputtering. The hard layer grows following the surface roughness so that the two dimensional texture is maintained.

A magnetic recording medium can be obtained by depositing a magnetic material on the surface of the substrate thus prepared, by sputtering or plating and coating a protective layer thereon.

If necessary, a liquid lubricant may be applied to the roughened surface.

As described in the foregoing, according to the process of the present invention, the roughness is formed by the difference in the etching rates by utilizing the difference in the etching rate between the anodized aluminum substrate and the material packed in the pores of the anodized aluminum, whereby the uniformity of the distribution of the protrusions or recesses of the roughness can readily be attained, and mass production of disk substrates having uniform quality is possible. Further, by depositing magnetic material on the surface of this substrate, it is possible to avoid a problem of bit errors due to the conventional texture treatment.

Now, the present invention will be described in further detail with reference to Examples. However, it should be understood that the present invention is by no means restricted to such specific Examples.

EXAMPLE I

Packing material is Cu.

On the surface of a glass plate used as a substrate, an aluminum coating layer having a thickness of 1 μm was formed by vapor deposition. This substrate was subjected to anodic oxidation treatment in a 3% oxalic acid bath at an applied voltage of 48V to form an anodized aluminum coating layer having a pore diameter of 250 Å and a pore distance of 1,100 Å. Then, this substrate was subjected to electroplating treatment in a CuSO₄ bath to precipitate and pack Cu in the pores. Then, the surface of this substrate was polished for 5 minutes by means of alumina powder having a particle size of 0.8 μm to make the surface smooth and to bring the thickness of the anodized aluminum layer to 0.5 μm.

Then, the polished substrate was subjected to etching treatment.

One substrate was subjected to chemical etching treatment in a 4% NaOH aqueous solution so that the etching rate of the anodized aluminum is larger than the etching rate of Cu, whereby two dimensional roughness was formed on the substrate surface with columnar Cu protruding from the anodized aluminum surface as shown by the surface structure in FIG. 1(a).

Figure 2:
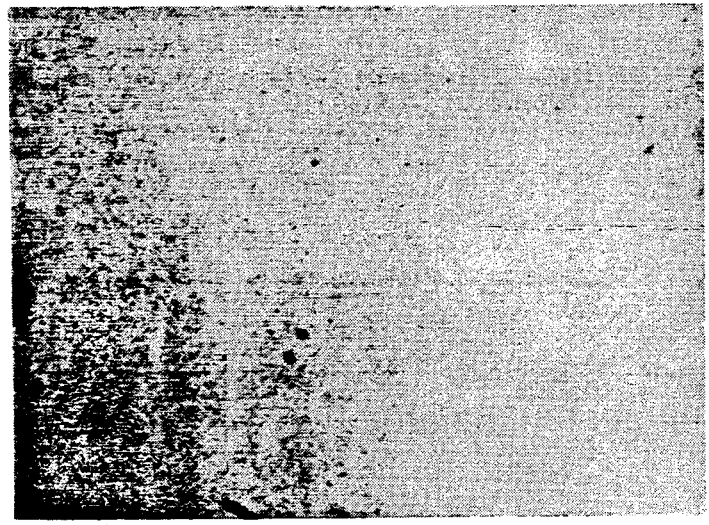
FIG. 2 is a differential interference microscopic photograph showing the surface texture of a substrate after the etching treatment.
Figure 3:
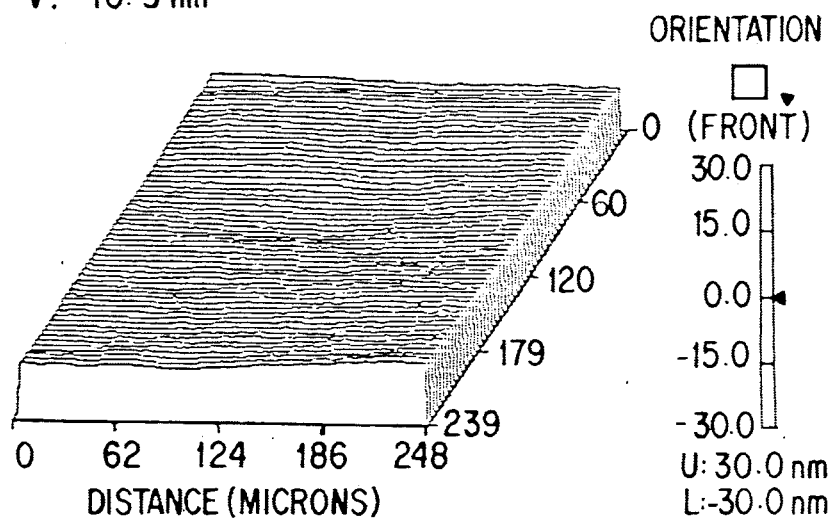
FIG. 3 is is an enlarged perspective view of the surface texture of the same substrate by means of a laser interference-type roughness meter.
Figure 13:
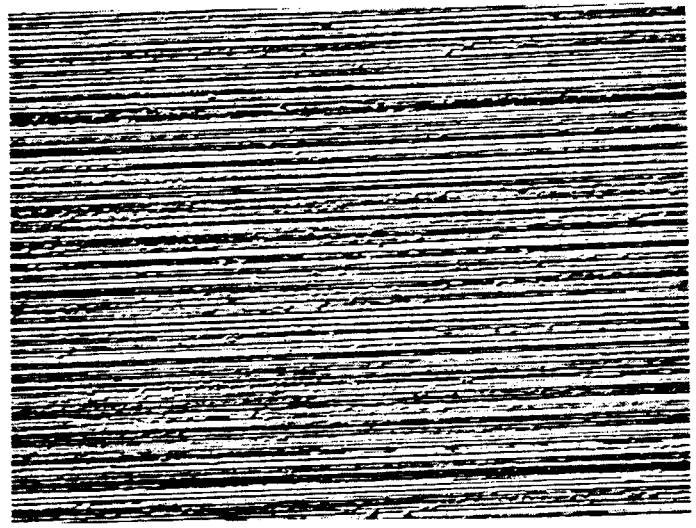
FIG. 13 is a differential interference microscopic photograph showing the surface texture of a substrate treated by conventional mechanical texture treatment.
Figure 14:
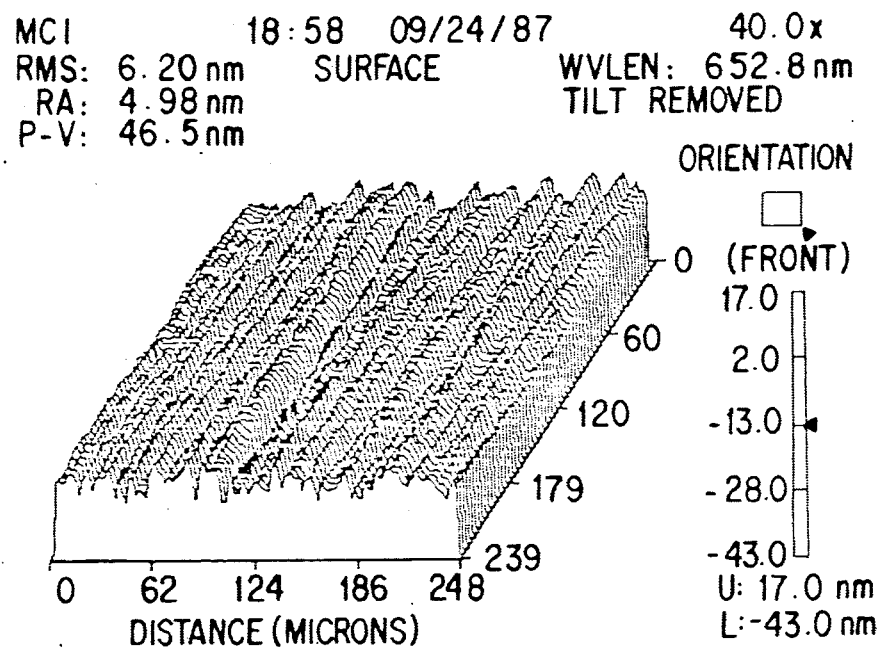
FIG. 14 is an enlarged perspective view of the surface texture of the same substrate by means of a laser interference-type roughness meter.

FIG. 2 is a diffraction interference microscopic photograph (400 magnifications) showing the surface texture of the substrate after the etching treatment. FIG. 3 is an enlarged perspective view of an area of 248 μm×248 μm of the same surface texture by means of a laser interference-type roughness meter. When they are compared with FIGS. 13 and 14, the difference in roughnesss is evident, and it should be understood that the roughness of the substrate of the present invention is very uniform.

Figure 1B:
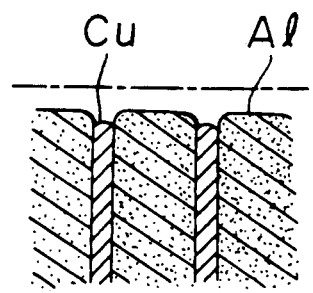

Another substrate was subjected to sputter etching treatment with Ar as sputtering gas under a vacuum of $10^{-3}$ Torr at an applied voltage of 600V so that the etching rate of Cu is larger than that of the anodized aluminum, whereby similarly uniform two dimension roughness was formed on the substrate surface with the upper end of columnar Cu being recessed from the anodized aluminum surface as shown by the surface structure in FIG. 1(b).

Then, a magnetic material was coated on the surface of each substrate thus obtained to obtain a magnetic disk, and the relation between the depth of the roughness and the friction coefficient of the magnetic disk was examined. The coating of the magnetic material was conducted under the following conditions:
  Substrate temperature: 130° C.
  Undercoating layer Cr: 1,100 Å
  Magnetic layer Co—Ni: 600 Å
  Protective layer C: 200 Å

Figure 4:
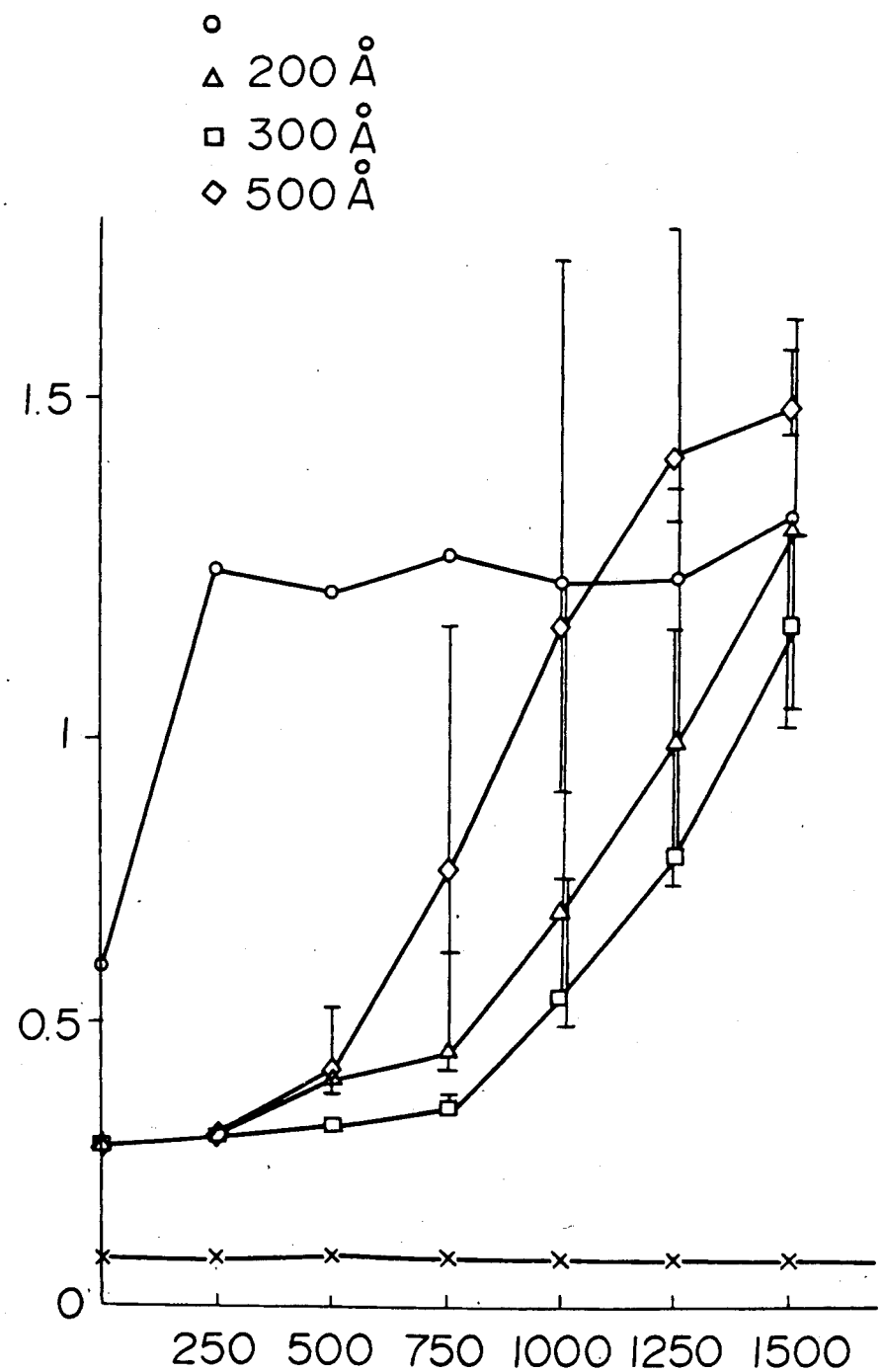
FIG. 4 is a graph showing the relation between the depth of roughness and the friction coefficient of the surface of the substrate.

The results are shown in FIG. 4. The load of the magnetic head used for the measurement was 15 g, and the running speed was 0.2 m/sec.

In the Figure, symbol △ represents a substrate with the depth of roughness being 200 Å, symbol o represents a substrate with the depth of the roughness being 300 Å and symbol ◆ represents a substrate with the depth of roughness being 500 Å. A substrate having a depth of roughness of 100 Å was substantially the same as the substrate with the depth of roughness being 200 Å. In the Figure, a substrate to which no etching treatment was applied i.e. a substrate having no surface roughness, is shown by symbol ◯. Further, symbol X represents a substrate with the depth of roughness being 200 Å and having a liquid lubricant applied to its surface.

As a result of such measurements, it has been found that substrates with the depth of roughness being from 50 to 5,000 Å have a friction coefficient within a permissible range.

Further, with respect to the magnetic disks obtained above, the changes of the friction coefficients due to the changes of the environmental conditions were measured by a high humidity test and a high temperature running test.

Figure 5:
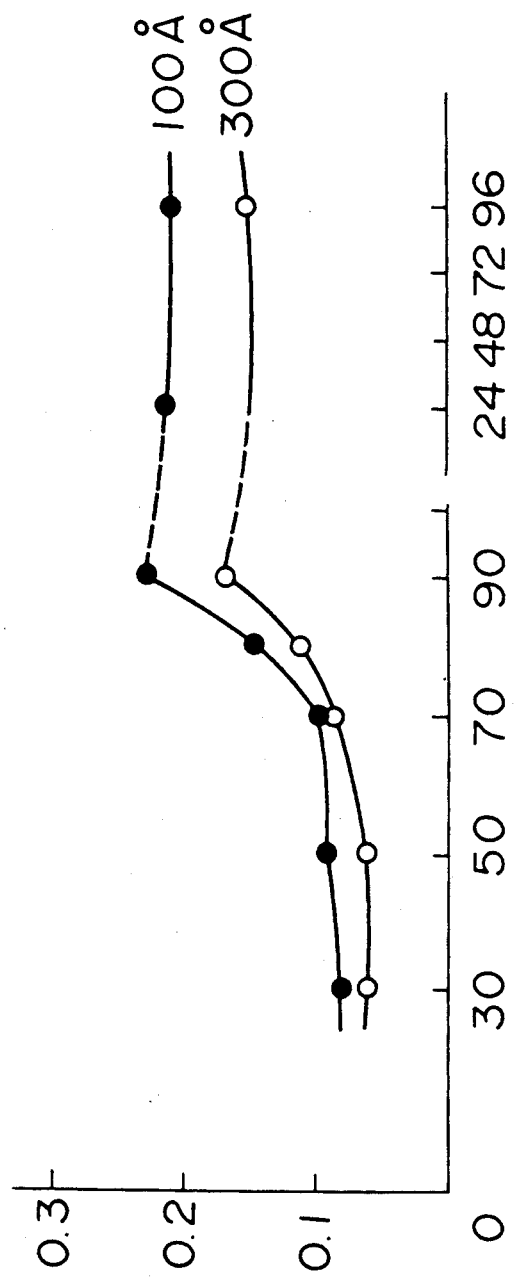
FIGS. 5 and 6 are graphs showing the changes in the friction coefficients due to changes of the environmental conditions.

For the high humidity test, a carbon coating of 200 Å was applied to the surface of each substrate. Two types of substrates i.e. with the depth of roughness being 100 Å and 300 Å, were employed. The results of the test are shown in FIG. 5. It is evident that the changes in the friction coefficients are very small under usual operation conditions.

Figure 6:
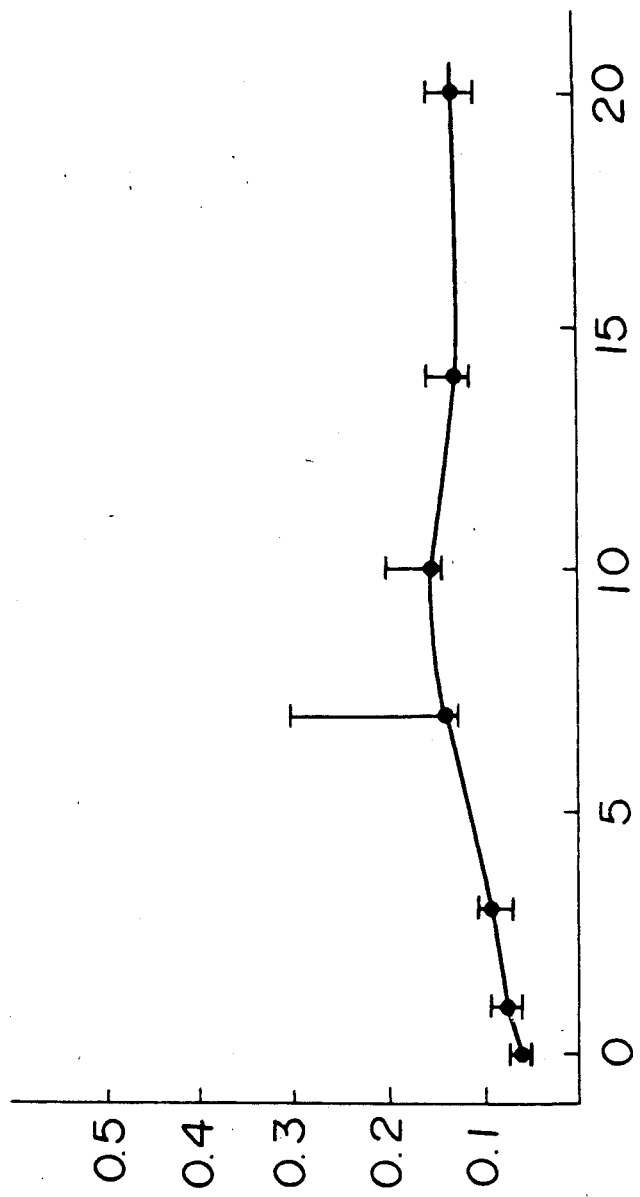

The high temperature running test was conducted at a temperature of 80° C. at a rotational speed of 3,600 rpm by using a magnetic disk with the depth of roughness being 200 Å and provided with a carbon coating of 200 Å. The test results are shown in FIG. 6. It is evident that irrespective of the number of days left to stand, the friction coefficient is very stable at a low level.

EXAMPLE II packing material is Ni

On the surface of a glass plate used as a substrate, an aluminum coating layer having a thickness of 1 μm was formed by vapor deposition. This substrate was subjected to anodic oxidation treatment in a 3% oxalic acid bath at an applied voltage of 48V to form an anodized aluminum coating layer having a thickness of 0.5 μm, a pore diameter of 250 Å and a pore distance of 1,100 Å. Then, this substrate was subjected to electrodeposition treatment in a bath of a solution containing 30 g/l of $NiSO_4$ to pack Ni in the pores. Then, the surface of this substrate was polished by means of alumina powder having a particle size of 0.3 μm to make the surface smooth and to bring the thickness of the anodized aluminum coating layer to 0.3 μm.

Then, the polished substrate was subjected to chemical etching treatment in a 10% phosphoric acid-chromic acid mixture solution. In this manner two dimensional roughness having a depth of 100 Å, 200 Å, 300 Å or 500 Å was formed.

After the etching treatment, a magnetic material was sputtered onto the substrate under following conditions:
  Substrate temperature: 150° C.
  Undercoating layer Cr: 1,000 Å
  Magnetic layer Co—Ni: 600 Å
  Protective layer C: 200 Å

Figure 7:
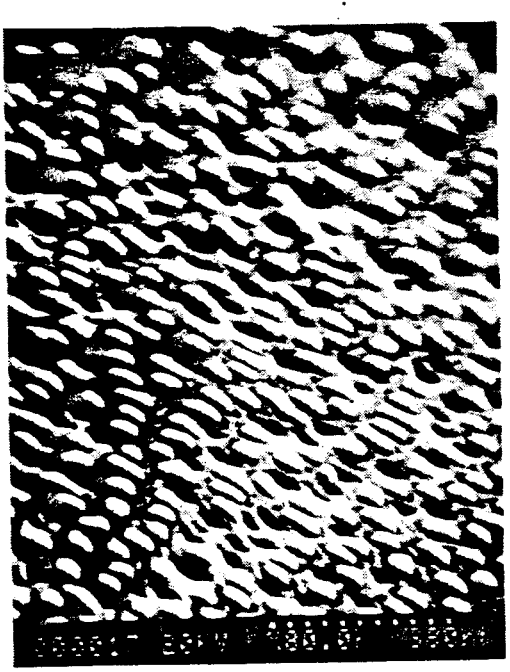
FIG. 7 is an electron microscopic photograph showing the surface texture of a substrate after the Ni-packing and chemical etching treatment.
Figure 8:
FIG. 8 is an electron microscopic photograph showing the surface texture of the same substrate after sputtering magnetic material and coating a carbon protective layer thereto.

FIG. 7 is an electron microscopic photograph (inclination angle of 70°) showing the surface texture of the substrate after packing pores with Ni, followed by the chemical etching, and FIG. 8 is an electron microscopic photograph (inclination angle of 70°) showing the same substrate after sputtering the magnetic material and coating the carbon protective layer thereto.

EXAMPLE III

Packing material is Sn

An Al-4%Mg alloy was used as a substrate. This substrate was subjected to anodic oxidation treatment in a 3% oxalic acid bath at an applied voltage of 48V to form an anodized aluminum coating layer having a thickness of 10 μm, a pore diameter of 250 Å and a pore distance of 1,100Å. Then, this substrate was subjected to electrodeposition treatment in a solution containing 30 g/l of $SnSO_4$ until Sn overflowed from pores, to pack Sn in the pores. Then, the surface of this substrate was polished with alumina powder having a particle size of 0.3 μm until the thickness of the coating layer became 7 μm as the first polishing and then polished with silica powder having a particle size of 0.1 μm until the thickness of the coating layer became from 7 to 6 μm as the second polishing, to make the surface smooth.

Then, the polished substrate was subjected to chemical etching treatment in a 10% phosphoric acid-chromic acid mixture solution. In the same manner as in Example II, two dimensional roughness having a depth of 100 Å, 200 Å, 300 Å or 500 Å was formed depending upon the dipping time.

After the etching treatment, a magnetic material was sputtered onto the substrate under the following conditions:
  Substrate temperature: 100° C.

Undercoating layer Cr: 1,000 Å
Magnetic layer Co—Ni: 600 Å
Protective layer C: 200 Å

Figure 9:
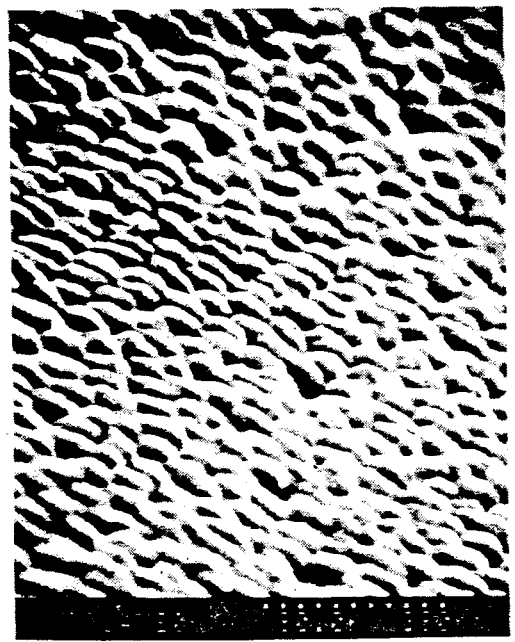
FIG. 9 is an electron microscopic photograph showing the surface texture of a substrate after the Sn-packing, etching treatment, magnetic material sputtering and carbon coating.

FIG. 9 is an electron microscopic photograph (inclination angle of 70°) of the substrate after the magnetic material was sputtered and the carbon protective layer was coated.

EXAMPLE IV

Packing material is teflon

An Al-4%Mg alloy substrate was subjected to anodic oxidation treatment in a 3% oxalic acid bath at an applied voltage of 48V to form an anodized aluminum coating layer having a thickness of 10 μm, a pore diameter of 250 Å and a pore distance of 1,100 Å. Then, this substrate was dipped in a 1% $H_3PO_4$ solution for 10 minutes for pore enlarging treatment to form pores having a pore diameter of 600 Å and a pore distance of 1,100 Å. This substrate was dipped in molten teflon at 350° C., and teflon was packed in the pores by heat impregnation treatment. After this teflon coating, the surface of this substrate was polished with alumina powder having a particle size of 0.3 μm until the thickness of the coating layer became 0.5 μm, to make the surface smooth.

Then, the polished substrate was subjected to chemical etching treatment in a 3% phosphoric acid-chromic acid mixture solution. Thus, two dimensional roughness having a depth of 100 Å, 200 Å, 300 Å or 500 Å was formed on the depth of substrate surface in the same manner as in Example II.

After the etching treatment, a magnetic material was sputtered onto the substrate under the same conditions as in the preceeding Examples.

EXAMPLE V

Packing material is an acrylate resin

An Al-4%Mg alloy substrate was subjected to anodic oxidation treatment in a 3% oxalic acid bath at an applied voltage of 48V to form an anodized aluminum coating layer having a thickness of 9 μm, a pore diameter of 250 Å and a pore distance of 1,100 Å. Then, this substrate was dipped a 1% $H_3PO_4$ solution for 10 minutes to form pores having a pore diameter of 600 Å and a pore distance of 1,100 Å. Then, the substrate was dipped in a water-soluble acrylate resin having 20% of solid content for 1 minutes and withdrawn and held for 3 minutes to complete dip coating. Then, the substrate was baked at 180° C. for 10 minutes. Then, the surface of this substrate was polished with alumina powder having a particle size of 0.3 μm until the thickness of the coating layer became 8 μm.

Then, the polished substrate was subjected to chemical etching treatment in a 10% phosphoric acid-chromic acid mixture (5:5) solution. Thus, two dimensional roughness having a depth of 100 Å, 200 Å, 300 Å or 500 Å was formed in the same manner as in Example II.

After the etching treatment, a magnetic material was sputtered onto the substrate under the same conditions as in Example III. However, the substrate temperature was 130° C.

EXAMPLE VI

Packing by reducing treatment

An Al-4%Mg alloy substrate was subjected to anodic oxidation treatment in a 3% oxalic acid bath at an applied voltage 48V to form an anodized aluminum coating layer having a thickness of 10 μm, a pore diameter of 250 Å and a pore distance of 1,100 Å. Then, this substrate was dipped in a 1% $H_3PO_4$ solution for 10 minutes to form pores having a pore diameter of 850 Å and a pore distance of 1,100 Å. To this substrate, a coating material comprising 600 g of $NiCl_2$, 1000 cc of $H_2O$ and 30 g of dextrin was coated, and then heat reducing treatment was conducted in $H_2$ at 450° C. for 10 minutes. Then, the surface of this substrate was polished with alumina powder having a particle size of 0.1 μm until the thickness of the coating layer became 9 μm.

Then, the polished substrate was subjected to chemical etching treatment in a 10% phosphoric acid-chromic acid mixture (5:5) solution. Thus, two dimensional roughness having a depth of 100 Å, 200 Å, 300 Å or 500 Å was formed.

After the etching treatment, a magnetic material was sputtered onto the substrate under the same conditions as in Example III.

With respect to the magnetic disk substrates obtained in Examples II to VI, tests were conducted for the relation between the depth of roughness and the frictional coefficient, and the change in the frictional coefficient due to the environmental conditions was measured by the high humidity test and the high temperature running test under the same conditions as in Example I, whereby substantially the same results as in Example I were obtained.

Further, with respect to the magnetic recording media obtained in each Example, tests were conducted for record reproduction characteristics.

Figure 10A:
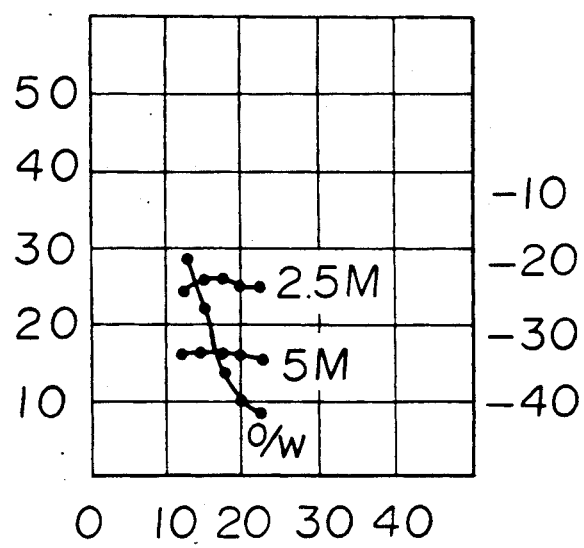
FIG. 10A is a graph showing the record reproduction characteristics.
Figure 10B:
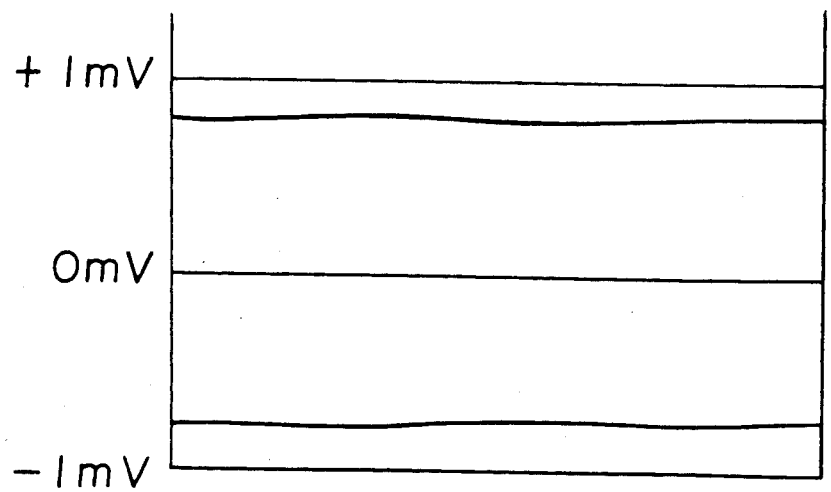
FIG. 10B is a graph showing the output wave form.
Figure 10:
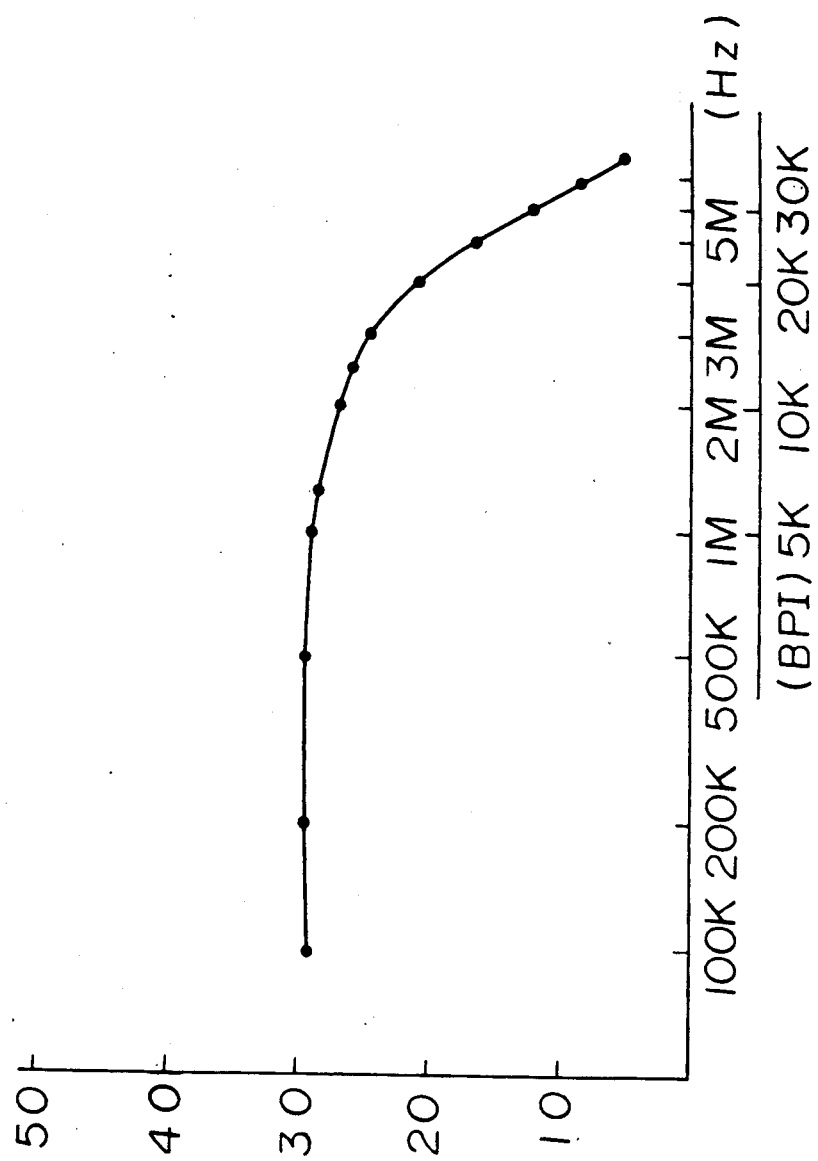
FIGS. 10-A to 10-C show record reproduction characteristics of a magnetic disk according to one embodiment.

FIGS. 10A to 10C show the results of measurement wherein the magnetic disk in Example II (packing material: Ni, magnetic material: horizontally magnetized layer of Co—Ni) was tested by using a Mn—Zn monosilic type magnetic head (product number M556, manufactured by Matsushita Electric Industrial Company Limited) (head gap: 0.5 μm, track width: 15 μm, flying height: 0.1 μm).

FIG. 10A is a graph of record reproduction characteristics showing the relation between the electric current applied to the magnetic head at the time of recording on the above magnetic medium at 2.5 MHz and 5 MHz, respectively, and the output voltage obtained at the magnetic head at the time of the reproduction of the magnetic medium, and the attenuation of output at the time of overwriting. At each recording wave length, a constant head output is obtainable irrespective of the recording current.

FIG. 10B is a graph of the output wave form showing the changes of the maximum value and the minimum value of the head output.

FIG. 10C is a graph of the frequency characteristics showing the relation of the head output to the recording frequency. The output value is substantially constant form 100 KHz to 2 MHz, and about 20 mV is obtainable even at 5 MHz. The numerals for the recording density represent the recording densities corresponding to the frequencies given thereabove, respectively.

Figure 11A:
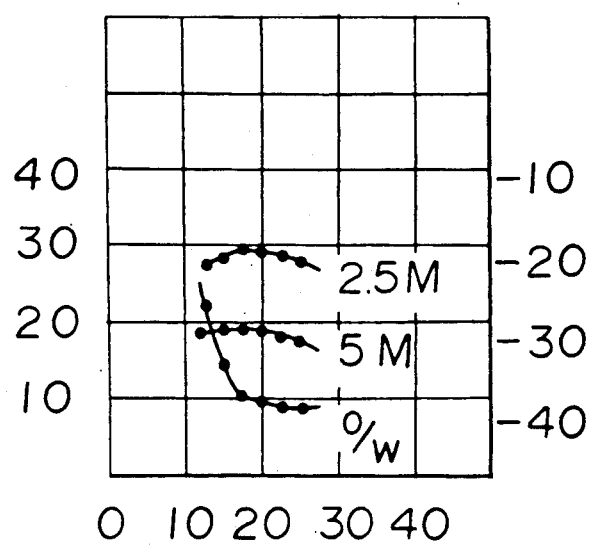
FIGS. 11A to 11C are graphs showing similar record reproduction characteristics of a magnetic disk according to another embodiment.
Figure 11B:
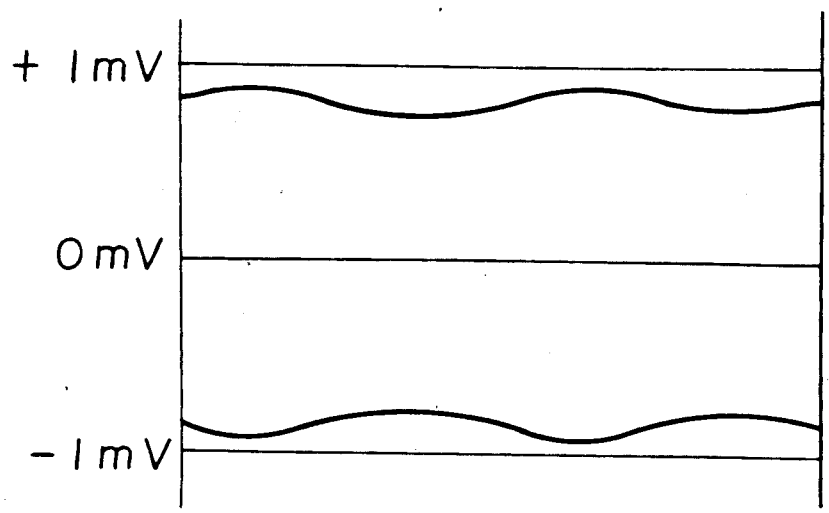
Figure 11C:
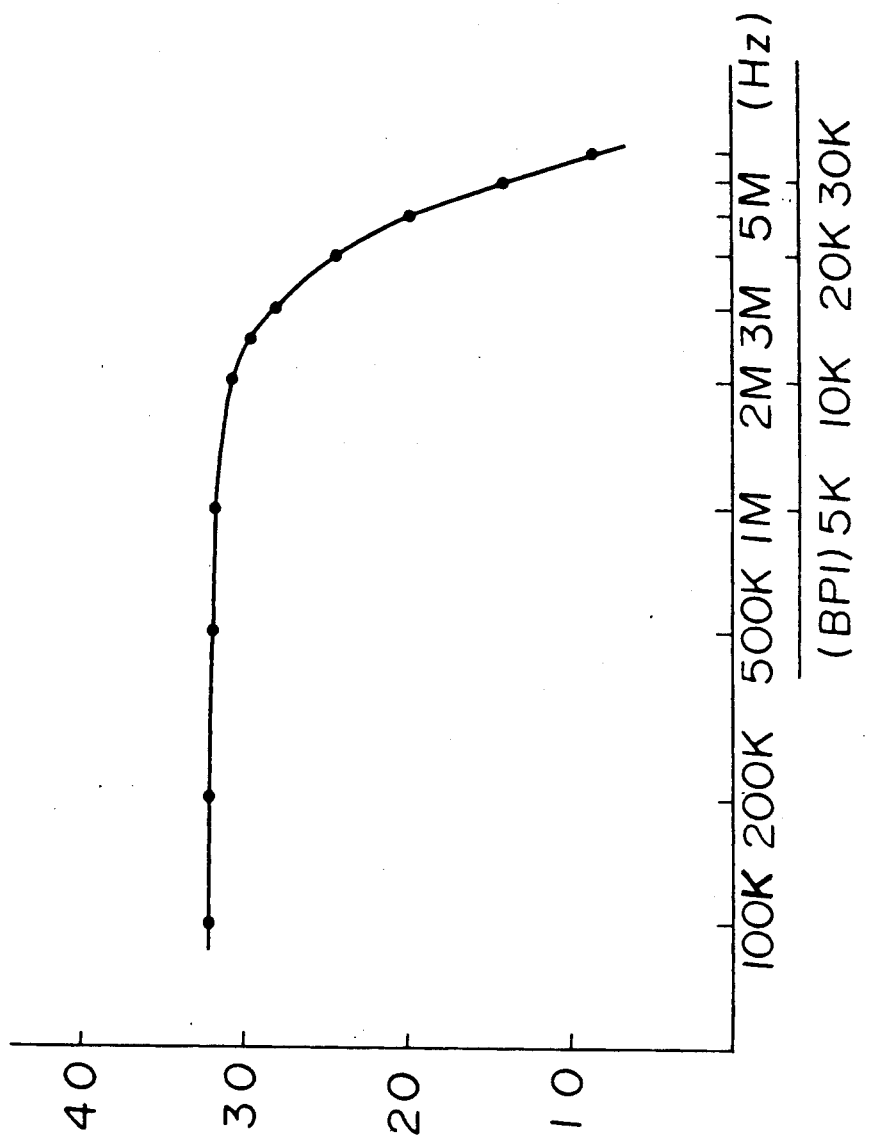

FIGS. 11A to 11C correspond to FIGS. 10A to 10C, respectively, in a case where the magnetic disk in Example III (packing material: Sn, magnetic material: Co—Ni) is tested under the same measuring conditions by using a magnetic head of product number M515.

As is evident from the comparison of FIG. 11B with FIG. 10B, when Ni is used as the packing material and a horizontally magnetized layer of Co—Ni or Co—Cr is used as the magnetic material to weaken the magnetic bond, high stability is obtainable without no substantial change in the head output (modulation) irrespective of the recording current, although the head output lowers more or less. This is believed to be attributable to the interaction between the perpendicularly magnetized layer constituting the under coating layer and the horizontally magnetized layer constituting the upper layer on the substrate.

Figure 12:
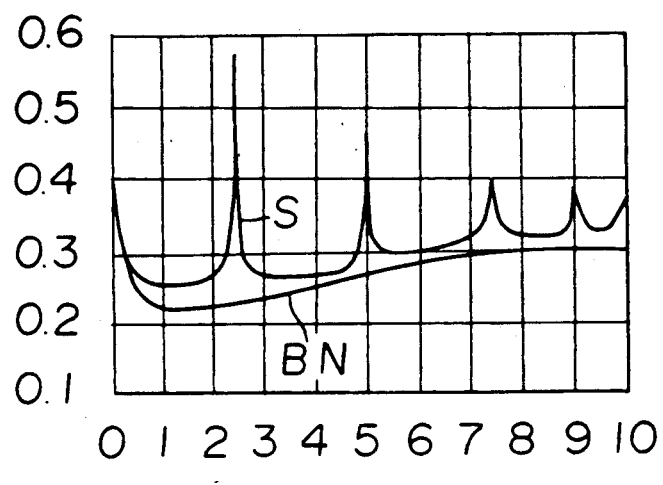
FIGS. 12A and 12B are graphs showing the results of the signal-to-noise tests of a magnetic disk of the present invention and of a conventional product, respectively.
Figure 12:
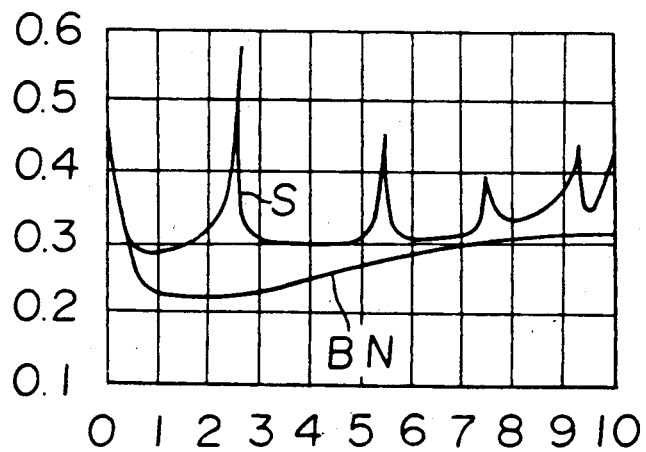

Further, the results of the signal to noise test of the magnetic disk obtained by the chemical texture method of the present invention were compared with the results of the signal to noise test of the magnetic disk obtained by the conventional mechanical texture treatment. FIG. 12A shows the test results of the magnetic disk of the present invention, and FIG. 12B shows the test results of the conventional product. In these Figures, line BN indicates the background noise of the testing apparatus, line S is the signal, and the area between BN and S shows the noise level. Thus, it is understood that by using the magnetic disk substrate of the present invention, the noise is reduced to one half of the noise by the conventional product.

As a result of chemical texture treatment of the above various materials, the following conclusion was obtained.

a) The mechanical nature (frictional coefficient, humidity test, lubricating properties) of the magnetic disk is determined by the depth of the texture.

b) When a magnetic material (Ni) is used as the packing material for pores, and a magnetic material formed thereon is magnetized horizontally, modulation is reduced by the interaction between the perpendicularly magnetized underlayer and the horizontally magnetized upper layer.

These test results show that with the disk substrate and the process for its production according to the present invention, controlled texture treatment is possible as is different from the conventional mechanical texture and the desired sliding properties can be obtained. Thus, the industrial value of the present invention is significant.

What is claimed is:

1. A substrate for a magnetic disk, comprising an anodized aluminum layer having pores packed with a non-magnetic material having a different etching rate from that of the anodized aluminum layer and subjecting to polishing and etching treatment to form a finely roughened surface having a depth in the range of 50 to 5,000 Å due to the difference in the etching rate of the anodized aluminum layer and said non-magnetic material.

2. A process for producing a magnetic disk, which comprises:
   (a) packing pores of an anodized aluminum layer of a substrate with a material having a different etching rate from that of the anodized aluminum layer,
   (b) polishing a surface of the anodized layer and
   (c) subjecting the polished surface to etching treatment to have the packed material protruded or recessed from the surface of the anodized aluminum layer, thereby providing a finely roughened surface having a depth in the range of 50 to 5000 Å.

* * * * *

UNITED STATES PATENT AND TRADEMARK OFFICE
CERTIFICATE OF CORRECTION

PATENT NO.   : 5,047,274
DATED        : September 10, 1991
INVENTOR(S)  : NOBORU TSUYA ET AL It is certified that error appears in the above-identified patent and that said Letters Patent is hereby corrected as shown below:

Column 5, line 38, change "O" to --☐--.

Signed and Sealed this

Thirtieth Day of November, 1993

Attest:

BRUCE LEHMAN

Attesting Officer

Commissioner of Patents and Trademarks